(12) United States Patent
Joshi et al.

(10) Patent No.: US 10,178,395 B2
(45) Date of Patent: Jan. 8, 2019

(54) EXPLICIT SIGNALING OF ESCAPE SAMPLE POSITIONS IN PALETTE CODING MODE FOR VIDEO CODING

(71) Applicant: QUALCOMM Incorporated, San Diego, CA (US)

(72) Inventors: Rajan Laxman Joshi, San Diego, CA (US); Vadim Seregin, San Diego, CA (US); Wei Pu, San Diego, CA (US); Marta Karczewicz, San Diego, CA (US); Feng Zou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 578 days.

(21) Appl. No.: 14/869,581

(22) Filed: Sep. 29, 2015

(65) Prior Publication Data

US 2016/0094852 A1 Mar. 31, 2016

Related U.S. Application Data

(60) Provisional application No. 62/057,819, filed on Sep. 30, 2014.

(51) Int. Cl.
| | |
|---|---|
| *H04N 19/186* | (2014.01) |
| *H04N 19/13* | (2014.01) |
| *H04N 19/93* | (2014.01) |
| *H04N 19/176* | (2014.01) |
| *H04N 19/103* | (2014.01) |
| *H04N 19/70* | (2014.01) |
| *H04N 19/91* | (2014.01) |

(52) U.S. Cl.
CPC ......... *H04N 19/186* (2014.11); *H04N 19/103* (2014.11); *H04N 19/13* (2014.11); *H04N 19/176* (2014.11); *H04N 19/70* (2014.11); *H04N 19/91* (2014.11); *H04N 19/93* (2014.11)

(58) Field of Classification Search
None
See application file for complete search history.

(56) References Cited

U.S. PATENT DOCUMENTS

2010/0290533 A1* 11/2010 Minagawa .............. H03M 7/40
375/240.23

OTHER PUBLICATIONS

Joshi et al. "HEVC Screen Content Coding Draft Text 1," 18. JCT-VC Meeting, Jun. 30, 2014-Jul. 9, 2014, Sapporo; (Joint Collaborative Team on Video Coding of ISO/IEC JTC1/SC29/WG11 and ITU-T SG.16); URL: http://wftp3.itu.int/av-arch/jctvc-site/ , No. JCTVC-R1005, Aug. 9, 2014, XP030116693 (Year: 2014).*

(Continued)

*Primary Examiner* — Anand S Rao
*Assistant Examiner* — Tyler B Edwards
(74) *Attorney, Agent, or Firm* — Shumaker & Sieffert, P.A.

(57) ABSTRACT

A method of decoding video data, the method comprising receiving a run-length sequence indicative of a binary vector, the binary vector comprising indications of locations of escape samples in a block of video data encoded using a palette-based coding mode, decoding the run-length sequence to obtain the binary vector, and decoding the block of video data using the binary vector. The method of claim 1 may further comprise receiving palette entries for the block of video data receiving one or more escape samples, and receiving a plurality of flags indicating the palette mode for each respective pixel in the block of video data.

28 Claims, 8 Drawing Sheets

(56) References Cited

OTHER PUBLICATIONS

Sole et al. "AhG6: Bypass bins grouping in SAO," 101. MPEG Meeting; Jul. 16, 2012-Jul. 20, 2012; Stockholm; (Motion Picture Expert Group or ISO/IEC JTC1/SC29/WG11); No. m25375, Jul. 10, 2012, XP030053709 (Year: 2012).*

Joshi et al. "HEVC Screen Content Coding Draft Text 1," 18. JCT-VC Meeting, Jun. 30, 2014-Jul. 9, 2014, Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R1005, Aug. 9, 2014 (Year: 2014).*

Wiegand et al., "WD1: Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/WG11 and ITU-T SG.16); JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012 (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012 (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.

Bross et al., "High Efficiency Video Coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.

Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Cohen et al., "BoG report on CE6-related palette mode," JCT-VC Meeting; Oct. 17-24, 2014; Strasbourg, FR (Joint Collaborative Team on Video Coding of ISO/IEC JTC1/SC29/WG11 and ITU-T SG.16 ); URL:http://wftp3.itu.int/av-arch/jctvc-site/, No. JCTVC-S0292_r1; Version 2, Oct. 19, 2014, XP030117095, 27 pp.

Joshi et al., "High Efficiency Video Coding (HEVC) Screen Content Coding: Draft 1," JCT-VC Meeting; Jun. 30-Jul. 9, 2014; Sapporo, JP (Joint Collaborative Team on Video Coding of ISO/IEC JTC1/SC29/WG11 and ITU-T SG.16 ); URL: http://wftp3.itu.int/av-arch/jctvc-site/,, No. JCTVC-R1005, Aug. 9, 2014, XP030116693, 360 pp.

Sole et al., "AhG6: Bypass bins grouping in SAO," MPEG Meeting; Jul. 11-20, 2012; Stockholm, SE (Motion Picture Expert Group or ISO/IEC JTC1/SC29/WG11), JCTVC-J0054, No. m25375, Jul. 10, 2012, XP030053709, 3 pp.

Xiu et al., "Non-CE6: Removal of parsing dependency in palette-based coding," JCT-VC Meeting; Oct. 17-24, 2014; Strasbourg, FR (Joint Collaborative Team on Video Coding of ISO/IEC JTC1/SC29/WG11 and ITU-T SG.16 ); URL: http://wftp3.itu.int/av-arch/jctvc-site/ No. JCTVC-S0181-r1, Oct. 17, 2014, 9 pp. XP030116964.

Xu et al., "CE1-related: escape pixel coding in palette mode," JCT-VC Meeting; Feb. 10-18, 2015; Geneva, CH (Joint Collaborative Team on Video Coding of ISO/IEC JTC1/SC29/WG11 and ITU-T SG.16); URL:http://wftp3.itu.int/av-arch/jctvc-site/, No. JCTVC-T0076-v2, Feb. 11, 2015, XP030117206, 9 pp.

Joshi et al., "High Efficiency Video Coding (HEVC) Screen Content Coding: Draft 1," JCT-VC Meeting; Jun. 30-Jul. 9, 2014; Sapporo, JP (Joint Collaborative Team on Video Coding of ISO/IEC JTC1/SC29/WG11 and ITU-T SG.16 ); URL: http://wftp3.itu.int/av-arch/jctvc-site/,, No. JCTVC-R1005_v3, Aug. 27, 2014, XP030116693, 362 pp.

Pu et al., "AHG10: Suggested Software for Palette Coding based on RExt6.0," JCT-VC Meeting; Mar. 27-Apr. 4, 2014, Valencia, ES (Joint Collaborative Team on Video Coding of ISO/IEC JTC1/SC29/WG11 and TU-T SG.16 ); No. JCTVC-Q0094, Mar. 19, 2014, 4 pp.

Huang et al., "Description of Screen Content Core Experiment 3 (SCCE3): Palette mode," JCT-VC Meeting; Mar. 27-Apr. 4, 2014, Valencia, ES (Joint Collaborative Team on Video Coding of ISO/IEC JTC1/SC29/WG11 and ITU-T SG.16 ); No. JCTVC-Q1123, Apr. 18, 2014, 11 pp.

Flynn et al., "High Efficiency Video Coding (HEVC) Range Extensions text specification: Draft 7," JCT-VC Meeting; Mar. 27-Apr. 4, 2014; Valencia, ES (Joint Collaborative Team on Video Coding of ISO/IEC JTC1/SC29/WG11 and ITU-T SG.16 ); No. JCTVC-Q1005_v9, Jun. 19, 2014, 363 pp.

Pu et al., "Non-RCE4: Refinement of the Palette in RCE4 Test 2," JCT-VC Meeting; Jan. 9-17, 2014, San Jose, CA (Joint Collaborative Team on Video Coding of ISO/IEC JTC1/SC29/WG11 and ITU-T SG.16 ); No. JCTVC-P0231, Jan. 12, 2014, 4 pp.

International Search Report and Written Opinion from International Application No. PCT/US2015/053302, dated Feb. 17, 2016, 18 pp.

Invitation to Pay Additional Fees, from International Application No. PCT/US2015/053302, dated Dec. 8, 2015, 6 pp.

Response to Written Opinion dated Feb. 17, 2016, from International Application No. PCT/US2015/053302, filed on Jun. 22, 2016, 5 pp.

Second Written Opinion from International Application No. PCT/US2015/053302, dated Sep. 7, 2016, 10 pp.

Response to Second Written Opinion from corresponding PCT Application Serial No. PCT/US2015/053302 filed on Nov. 7, 2016 (23 pages).

International Preliminary Report on Patentability from corresponding PCT Application Serial No. PCT/US2015/053302 dated Dec. 15, 2016 (22 pages).

* cited by examiner

EXPLICIT SIGNALING OF ESCAPE SAMPLE POSITIONS IN PALETTE CODING MODE FOR VIDEO CODING

This application claims the benefit of U.S. Provisional Application No. 62/057,819, filed Sep. 30, 2014, the entire contents of which are incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

This disclosure relates to video encoding and decoding techniques. In particular, this disclosure describes techniques for encoding and decoding video data with a palette-based coding mode. In a palette-based coding mode, pixel values for a block of video data may be coded relative to a palette of color values associated with the block of video data. The palette of color values may be determined by a video encoder and may contain the color values that are most common for a particular block. The video encoder may assign an index into the palette of color values to each pixel in the block of video data, and signal such an index to a video decoder. The video decoder may then use the index into the palette to determine what color value to use for a particular pixel in the block.

This disclosure also describes techniques for coding indications of the locations of escape samples used in a block of video data coded using a palette-based coding mode. An escape sample is a pixel in the block of video data coded using a palette-based coding mode that has a color value that is not within the palette associated with the block of video data. This disclosure proposes techniques whereby a binary vector is coded, each element in the binary vector indicating whether or not a particular pixel in the block is an escape sample. The binary vector may then be coded using run-length coding techniques for further compression.

In one example of the disclosure, a method of decoding video data comprises receiving information indicating the positions of escape samples in a block of video data encoded using a palette-based coding mode, wherein the information indicating the positions of escape samples in the block is received before receiving syntax elements indicating one or more palette-based coding modes and run values associated with the one or more palette-based coding modes, and decoding the block of video data using the received information.

In another example of the disclosure, an apparatus configured to decode video data comprises a memory configured to store the video data and a video decoder configured to receive information indicating the positions of escape samples in a block of the video data encoded using a palette-based coding mode, wherein the information indicating the positions of escape samples in the block is received before receiving syntax elements indicating one or more palette-based coding modes and run values associated with the one or more palette-based coding modes, and decode the block of the video data using the received information.

In another example of the disclosure, an apparatus configured to decode video data comprises means for receiving information indicating the positions of escape samples in a block of video data encoded using a palette-based coding mode, wherein the information indicating the positions of escape samples in the block is received before receiving syntax elements indicating one or more palette-based coding modes and run values associated with the one or more palette-based coding modes, and means for decoding the block of video data using the received information.

In another example, this disclosure describes a computer-readable storage medium storing instructions that, when executed, causes one or more processors configured to decode video data to receive information indicating the positions of escape samples in a block of the video data encoded using a palette-based coding mode, wherein the information indicating the positions of escape samples in the block is received before receiving syntax elements indicating one or more palette-based coding modes and run values associated with the one or more palette-based coding modes, and decode the block of the video data using the received information.

The details of one or more examples are set forth in the accompanying drawings and the description below. Other features, objects, and advantages will be apparent from the description and drawings, and from the claims.

DETAILED DESCRIPTION

Figure 1:
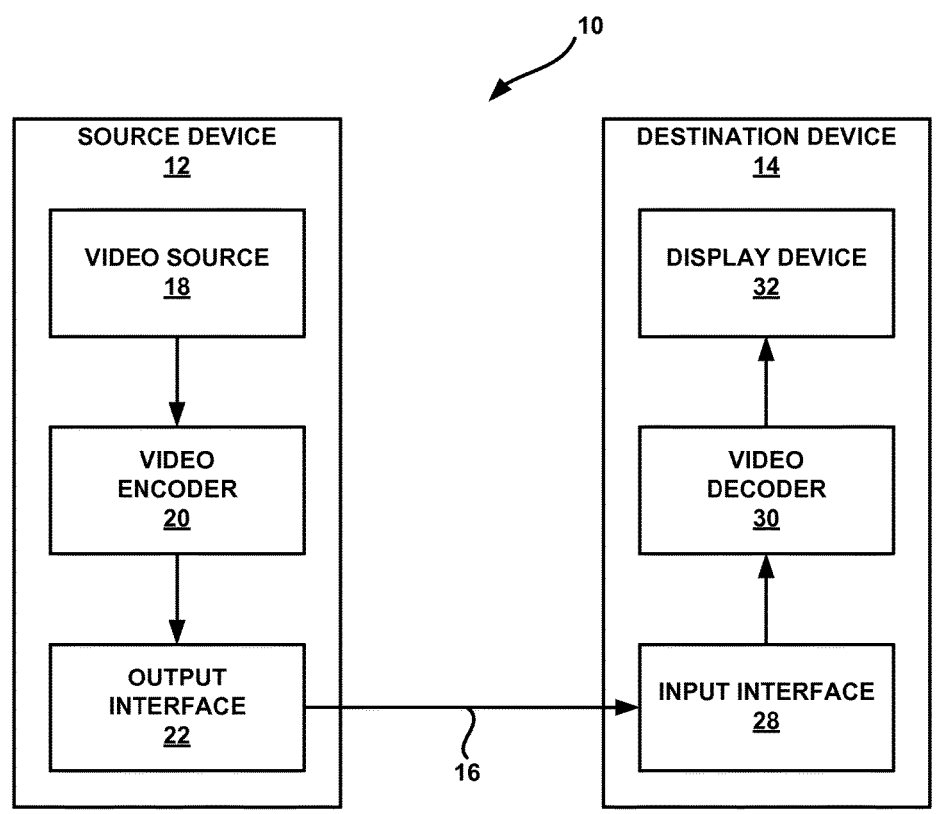
FIG. 1 is a block diagram illustrating an example video coding system that may utilize the techniques described in this disclosure.

This disclosure describes techniques for video coding and compression. In particular, this disclosure describes techniques for coding screen content using a palette-based coding mode. In various examples of the disclosure, techniques for the explicit signaling of escape sample positions in palette mode are disclosed.

In traditional video coding, images are assumed to be continuous-tone and spatially smooth. Based on these assumptions, various tools have been developed such as block-based transform, filtering, etc., and such tools have shown good performance for natural content videos. However, in applications like remote desktop, collaborative work and wireless display, computer-generated screen content may be the dominant content to be compressed. This type of screen content tends to have discrete-tone and feature sharp lines, and high contrast object boundaries. The assumption of continuous-tone and smoothness may no longer apply, and thus, traditional video coding techniques may be inefficient ways to compress screen content.

This disclosure describes palette-based coding techniques, which may be particularly suitable for computer-generated screen content coding. For example, assuming a particular area of video data has a relatively small number of colors. A video coder (e.g., a video encoder or video decoder) may code (i.e., encode or decode) a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

In the example above, a video encoder may encode a block of video data by determining a palette for the block, locating an entry in the palette to represent the value of each pixel, and encoding the palette and the index values for the pixels relating the pixel value to the palette. A video decoder may obtain, from an encoded bitstream, a palette for a block, as well as index values for the pixels of the block. The video decoder may relate the index values of the pixels to entries of the palette to reconstruct the pixel values of the block. The example above is intended to provide a general description of palette-based coding.

In some examples, the palette-based coding techniques may be configured for use with one or more video coding standards. Example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). High Efficiency Video Coding (HEVC) is a new video coding standard developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) Text Specification Draft 10 (for FDIS & Consent)," JCVC-L1003_v13, $12^{th}$ Meeting of JCT-VC of ITU-T SG16 WP 3 and ISO/IEC JCT 1/SC 29/WG 11, 14-23 Jan. 2013 ("HEVC Draft 10"), available from: http://phenix.int-evry.fr/jct/doc_end_user/documents/12_Geneva/wg11/JCTVC-L1003-v13.zip.

Recently, the design of HEVC has been finalized by the Joint Collaboration Team on Video Coding (JCT-VC) of ITU-T Video Coding Experts Group (VCEG) and ISO/IEC Motion Picture Experts Group (MPEG). The latest HEVC specification, referred to as HEVC Version 1 hereinafter, is described in "ITU-T H.265 (V1)," which as of Mar. 24, 2015 is available from http://www.itu.int/ITU-T/recommendations/rec.aspx?rec=11885&lang=en. Document ITU-T H.265, SERIES H: AUDIOVISUAL AND MULTIMEDIA SYSTEMS, Infrastructure of Audiovisual Services—Coding of Moving Video, "High Efficiency Video Coding," April 2013 also describes the HEVC standard. A recent specification of Range extensions, referred to as RExt hereinafter, is described in "ITU-T H.265 (V2)," which as of Mar. 24, 2015 is available from http://www.itu.int/ITU-T/recommendations/rec.aspx?rec=12296&lang=en.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure for palette-based video coding are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternatively, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

As will be explained in more detail below, video encoder 20 may be configured encode a block of video data using a palette-based coding mode, generate a binary vector comprising indications of locations of escape samples in the block of video data, and encode the binary vector to produce a run-length sequence. Likewise, video decoder 30 may be configured to receive a run-length sequence indicative of a binary vector, the binary vector comprising indications of locations of escape samples in a block of video data encoded using a palette-based coding mode, decode the run-length sequence to obtain the binary vector, and decode the block of video data using the binary vector.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example of palette-based coding, video encoder 20 may encode a block of video data by determining a palette for the block, locating an entry in the palette to represent the value of each pixel, and encoding the palette and the index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

A stated above, in an example palette-coding mode, a palette may include entries numbered by an index. Each may entry may represent color component values or intensities (for example, in color spaces such as RGB, YUV, CMYK, or other formats), which can be used as predictor for a block or as final reconstructed block samples. As described in standard submission document JCTVC-Q0094 (Wei Pu et al., "AHG10: Suggested Software for Palette Coding based on RExt6.0," JCTVC-Q0094, Valencia, ES, 27 Mar.-4 Apr. 2014) a palette may include entries that are copied from a predictor palette. A predictor palette may include palette entries from blocks previously coded using palette mode or other reconstructed samples. For each entry in the predictor palette, a binary flag is sent to indicate whether that entry is copied to the current palette (indicated by flag=1). This is referred to as the binary palette prediction vector. Additionally the current palette may comprise (e.g., consist of) new entries signaled explicitly. The number of new entries may be signaled as well.

As proposed in the example of JCTVC-Q0094, each sample in a block coded with the palette may belong to one of the three modes, as set forth below:

Escape mode. In this mode, the sample value is not included into a palette as a palette entry and the quantized sample value is signaled explicitly for all color components. It is similar to the signaling of the new palette entries, although for new palette entries, the color component values are not quantized.

CopyFromTop mode (also called copy above mode). In this mode, the palette entry index for the current sample is copied from the sample located directly above in a block. In other examples, for copy above mode, a block of video data may be transposed so that the sample above the block is actually the sample to the left of the block.

Value mode (also called index mode). In this mode, the value of the palette entry index is explicitly signaled.

As described herein, a palette entry index may be referred as a palette index or simply index. These terms can be used interchangeably to describe techniques of this disclosure.

For CopyFromTop and Value modes, a run value may be signaled as well. In this disclosure, the run value may be referred to simply as "run." Signaling index and run value is somewhat similar to Run Length Coding. The run specifies the number of subsequent samples that belong to the same mode. For example, if consecutive indices are 0, 2, 2, 2, 2, 5, for the second sample, a Value mode may be signaled. After signaling the index equal to 2 in the example above, a run of 3 is signaled signifying that the 3 subsequent samples also have the same index (2). Similarly, a run of 4 following CopyFromTop mode means that a total of 5 indices are copied from the corresponding indices above.

In a third screen content coding core experiment, subtest B.6, as described in document JCTVC-Q1123 (Yu-Wen Huang et al., "Description of Screen Content Core Experiment 3 (SCCE3): Palette Mode," JCTVC-Q1123, Valencia, ES, 27 Mar.-4 Apr. 2014), another mode was introduced into the software released by Canon on 26 May 2014. The macro for this mode was "CANON_NEW_RUN_LAST_TRANSITION." This mode may be similar to value mode in that it comprises (e.g., consists of) an index value followed by a run specifying the number of subsequent samples which have the same palette index. A difference between value mode and the new mode (referred to as Transition Run) is that the index value of the transition run mode is not signaled. Rather, the index value is inferred. For instance, a video decoder may infer the index value. The inferred index will be referred to as a transition index.

There may be two or more distinct ways of signaling the modes. In JCTVC-Q0094, if the macro "PLT_REMOVE_ESCAPE_FLAG" is 0, an escape flag is signaled explicitly to indicate whether a sample in a block is coded in the escape mode. If the sample is not coded with the escape mode, an SPoint flag is signaled to indicate whether the mode is CopyFromTop or Value. The escape flag (e.g., "PLT_REMOVE_ESCAPE_FLAG") and the SPoint flag (when necessary) are not signaled for the subsequent run samples, and the values of those flags are inferred for all the samples included into the run. This method will be referred to as explicit escape method.

If the macro "PLT_REMOVE_ESCAPE_FLAG" is set to 1, the number of palette entries is increased by one and a special index (for example, the last palette index in the increased palette) is used as an indication of the escape mode. Such a technique may be referred to as an implicit escape technique. In this case, there are only two possible modes: CopyFromTop or Value. Thus, only SPoint flag is signaled. If a sample is coded in the Value mode and an index is equal to the escape index, the sample is inferred to be coded in the escape mode. In this case no run is signaled. In some examples, a run indicating a number of consecutive escape indices may also be signaled.

The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to a PU mode. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

In some examples, video encoder 20 may encode one or more syntax elements indicating a number of consecutive pixels in a given scan order that have the same pixel value. The string of like-valued pixel values may be referred to herein as a "run." In an example for purposes of illustration, if two consecutive pixels in a given scan order have different values, the run is equal to zero. If two consecutive pixels in a given scan order have the same value but the third pixel in the scan order has a different value, the run is equal to one. Video decoder 30 may obtain the syntax elements indicating a run from an encoded bitstream and use the data to determine the number of consecutive pixel locations that have the same index value.

In some examples, video encoder 20 and video decoder 30 may perform line copying for one or more entries of a map. For example, video encoder 20 may indicate that a pixel value for a particular entry in a map is equal to an entry in a line above the particular entry. Video encoder 20 may also indicate, as a run, the number of indices in the scan order that are equal to the entry in the line above of the particular entry. In this example, video encoder 20 and or video decoder 30 may copy index values from the specified neighboring line and from the specified number of entries for the line of the map currently being coded.

According to aspects of this disclosure, video encoder 20 and video decoder 30 may perform any combination of the techniques for palette coding described below.

Figure 2:
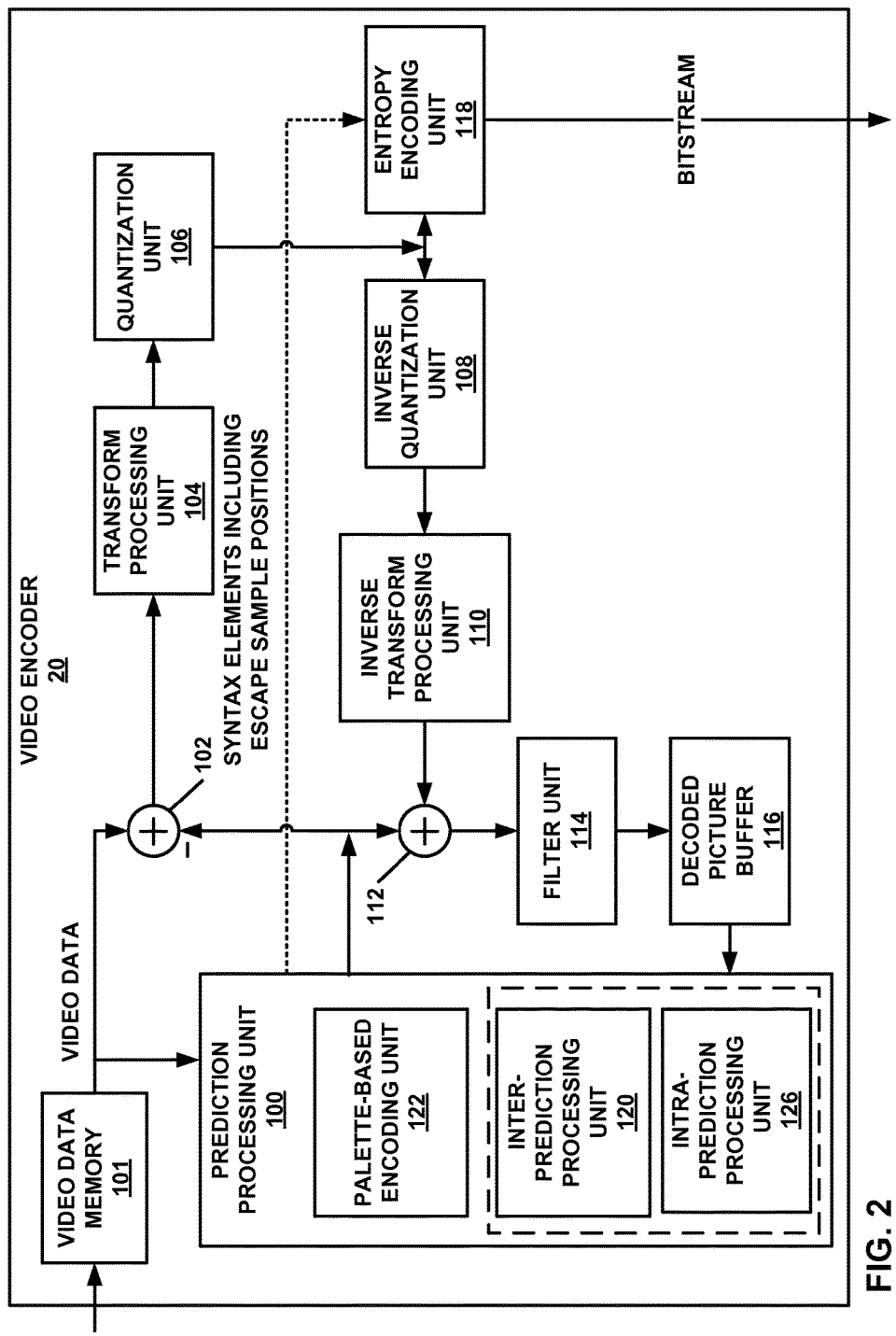
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video encoder 20, in one example, may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a prediction processing unit 100, video memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video memory 101 may store video data to be encoded by the components of video encoder 20. The video data stored in video memory 101 may be obtained, for example, from video source 18. Decoded picture buffer 116 may be a reference picture memory that stores reference video data for use in encoding video data by video encoder 20, e.g., in intra- or inter-coding modes. Video memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video memory 101 and decoded picture buffer 116 may be provided by the same memory device or separate memory devices. In various examples, video memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive blocks of the PU based at least in part on actual or interpolated samples at the reference regions indicated by the motion vectors of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described below.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
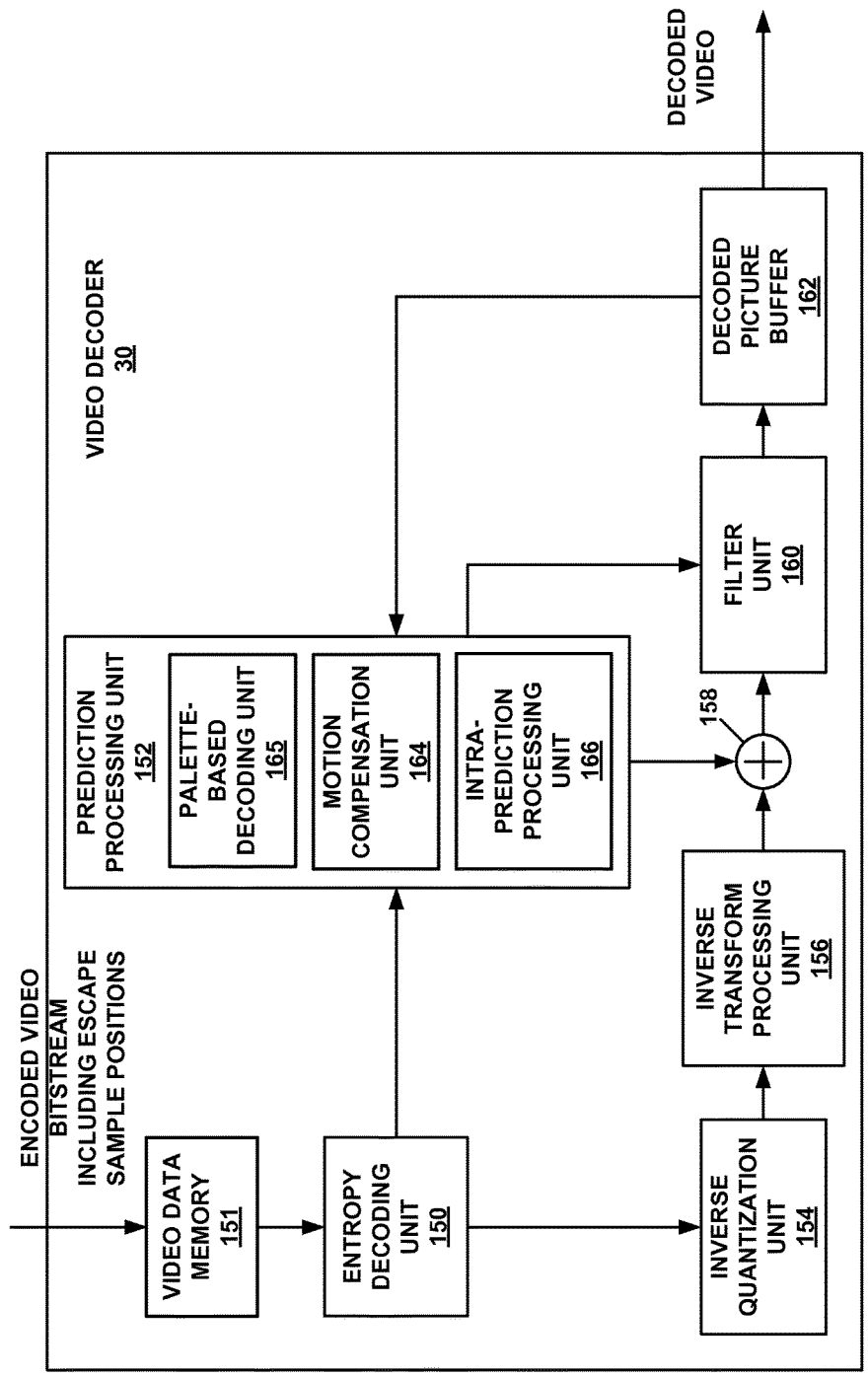
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some pixel locations in a block of video data with entries in the palette, select pixel values in the palette based on the information, and reconstruct pixel values of the block based on the selected pixel values in the palette.

In the example of FIG. 3, video decoder 30 includes an entropy decoding unit 150, video memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video memory 151 may store video data, such as an encoded video bitstream, to be decoded by the components of video decoder 30. The video data stored in video memory 151 may be obtained, for example, from channel 16, e.g., from a local video source, such as a camera, via wired or wireless network communication of video data, or by accessing physical data storage media. Video memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra-or inter-coding modes. Video memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video memory 151 and decoded picture buffer 162 may be provided by the same memory device or separate memory devices. In various examples, video memory 151 may be on-chip with other components of video decoder 30, or off-chip relative to those components.

A coded picture buffer (CPB) may receive and store encoded video data (e.g., which may be sent in NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

According to aspects of this disclosure, palette-based decoding unit 165 may be configured to perform any combination of the techniques for palette coding described below.

Figure 5:
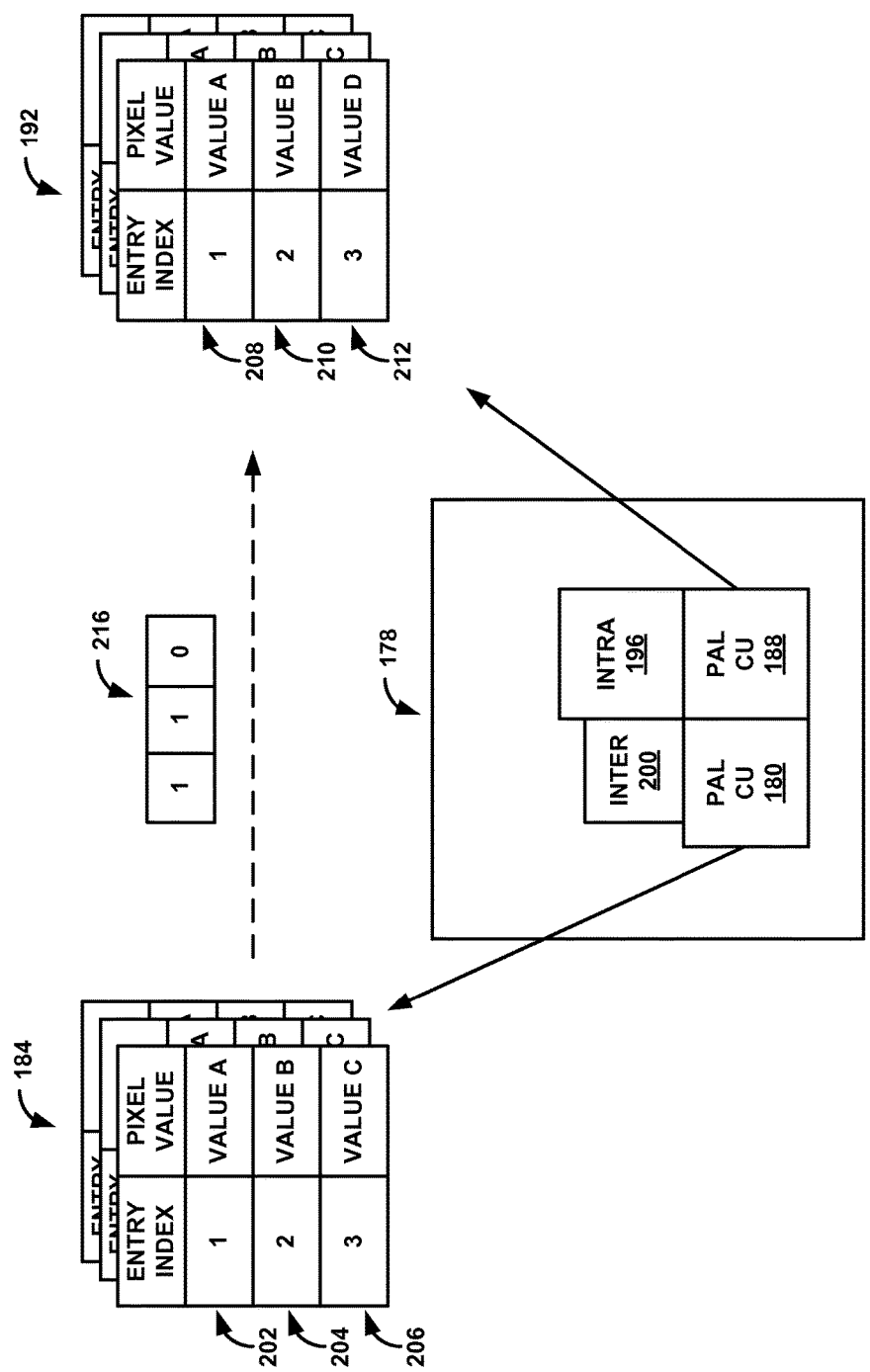
FIG. 5 is a conceptual diagram illustrating an example of determining palette entries for palette-based video coding, consistent with techniques of this disclosure.

FIG. 5 is a conceptual diagram illustrating an example of determining a palette for coding video data, consistent with techniques of this disclosure. The example of FIG. 5 includes a picture 178 having a first PAL (palette) coding unit (CU) 180 that is associated with first palettes 184 and a second PAL CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 5 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 5. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including $Y_i$, $U_i$, and $V_i$. In this case, the palette includes values for each of the components of the pixels. Accordingly, the representation of palettes 184 and 192 as a set of palettes having multiple individual palettes is merely one example and not intended to be limiting.

In the example of FIG. 5, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. In some examples, such as the example illustrated in FIG. 5, video encoder 20 and/or video decoder 30 may locate the previously coded CU such as a left neighboring CU (first CU 180) when determining a predictive palette for second CU 188.

In the example of FIG. 5, second palettes 192 include three entries 208-212 having entry index value 1, entry index value 2, and entry index value 3, respectively. Entries 208-212 relate the index values to pixel values including pixel value A, pixel value B, and pixel value D, respectively. In this example, video encoder 20 may code one or more syntax elements indicating which entries of first palettes 184 are included in second palettes 192. In the example of FIG. 5, the one or more syntax elements are illustrated as a vector 216. Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 5, the vector is a Boolean vector.

In some examples, video encoder 20 and video decoder 30 may determine a palette predictor list (which may also be referred to as a palette predictor table) when performing palette prediction. The palette predictor list may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor list are to be included in a palette for coding a current block.

Figure 6:
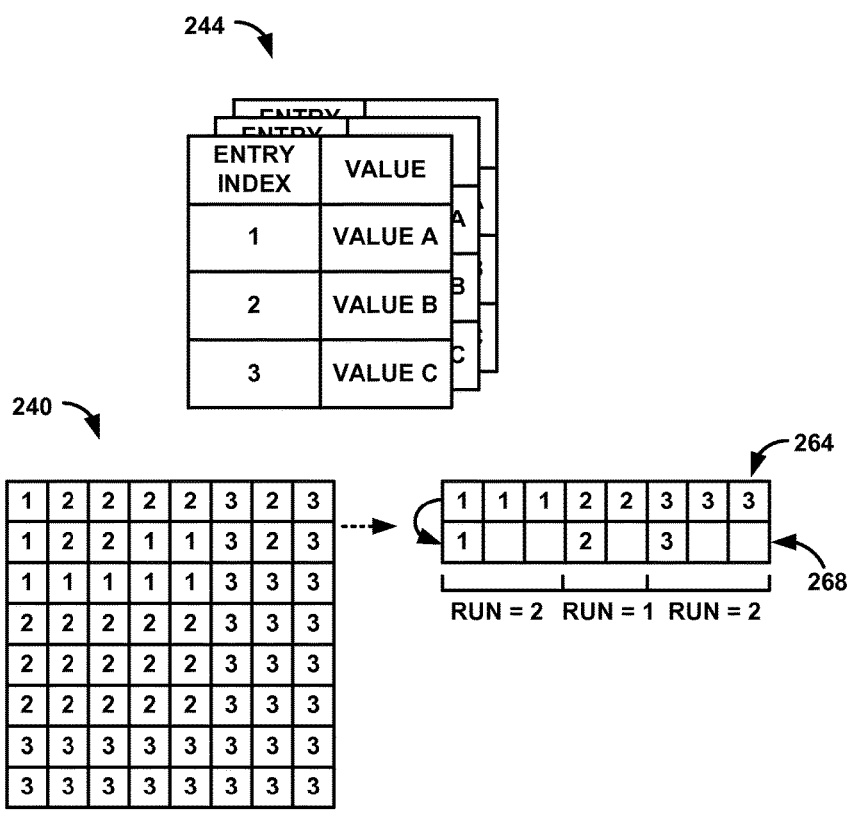
FIG. 6 is a conceptual diagram illustrating an example of determining indices to a palette for a block of pixels, consistent with techniques of this disclosure.

FIG. 6 is a conceptual diagram illustrating an example of determining indices to a palette for a block of pixels, consistent with techniques of this disclosure. For example, FIG. 6 includes a map 240 of index values (values 1, 2, and 3) that relate respective positions of pixels associated with the index values to an entry of palettes 244.

While map 240 is illustrated in the example of FIG. 6 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244.

Video encoder 20 may, in such an example, also encode a palette index (shown in the example of FIG. 6 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

As noted above, runs may be used in conjunction with a CopyFromTop or Value mode (also called, copy above mode and index mode, respectively). In an example for purposes of illustration, consider rows 264 and 268 of map 240. Assuming a horizontal, left to right scan direction, row 264 includes three index values of "1," two index values of "2," and three index values of "3." Row 268 includes five index values of "1" and three index values of "3." In this example, video encoder 20 may identify particular entries of row 264 followed by a run when encoding data for row 268 (e.g., CopyFromTop mode). For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the corresponding above positions of row 264.

After encoding the one or more syntax elements indicating the first position of row 264 and the run of two entries (noted above), video encoder 20 may encode, for the fourth and fifth positions in line 268 (from left to right), one or more syntax elements indicating a value of 1 for the fourth position and one or more syntax elements indicating a run of 1 (e.g., Value mode). Hence, video encoder 20 encodes these two positions without reference to another line.

Video encoder 20 may then encode the first position having an index value of 3 in row 268 relative to upper row 264 (e.g., indicating a copy from upper row 264 and the run of consecutive positions in the scan order having the same index value). Accordingly, video encoder 20 may select between coding pixel or index values of a line relative to other values of the line, e.g., using a run, coding pixel or index values of a line relative to values of another line (or column), or a combination thereof. Video encoder 20 may, in some examples, perform a rate/distortion optimization to make the selection.

Video decoder 30 may receive the syntax elements described above and reconstruct row 268. For example, video decoder 30 may obtain data indicating a particular location in a neighboring row from which to copy the associated index value for the position of map 240 currently being coded. Video decoder 30 may also obtain data indicating the number of consecutive positions in the scan order having the same index value. While described with respect to a horizontal scan order, the techniques of this disclosure may also be applied to another scan direction, such as a vertical or diagonal (e.g., 45 degrees or 135 degrees diagonally in block) scan direction.

Two aspects of palette coding, from a normative perspective, are the coding of the palette and the coding of the palette index for each sample in the block being coded in the palette coding mode. The coding of palette indices is performed using two primary modes, 'index' mode and 'copy above' mode. A palette index is signaled by coding a palette_mode flag. The 'index' mode is also used to indicate escape samples, i.e., samples that do not belong to the palette. In some proposals for palette coding mode in HEVC, the 'copy above' mode may not be used for the first row of the palette block. In addition, the 'copy above' mode for a particular row may not be used if the row above also uses 'copy above' mode. In these cases, an 'index' mode is inferred.

For 'index' mode, the value of the palette index for a sample is explicitly signaled using a truncated binary code. If the index is equal to the size of the palette, this indicates that the sample is an escape sample. In this case, the sample value or quantized samples value for each component is signaled. For example, if the palette size is 4, for non-escape samples, the palette indices are in the range [0, 3]. In this case, an index value of 4 signifies an escape sample. If the index indicates a non-escape sample, a run-length is signaled, the run-length specifying the number of subsequent samples in scanning order that share the same index. For escape samples, no run-length is signaled. In other examples, run-lengths may be signaled for escape samples.

For 'copy above' mode, the palette index for the current sample is copied from the sample located directly above it in a block. This is followed by the run-length, which indicates how many subsequent palette indices in the scanning order are also copied from the row above.

In some proposals for HEVC, the palette mode is signaled at a CU level, but it may be possible to signal it at a PU level. A flag, e.g., palette_esc_val_present_flag, is also signaled to indicate the presence of escape samples in a current block. It is also possible to signal palette modes in a different manner. For example, in W. Pu, F. Zou, M. Karczewicz, and R. Joshi, "Non-RCE4: Refinement of the palette in RCE4 Test 2," JCTVC-P0231, it was advocated to use an explicit flag to indicate whether the current sample was an escape sample. If the current sample was a non-escape sample, another flag was signaled to indicate whether the palette mode was 'copy above' mode or 'index' mode.

In current proposals for HEVC, when the 'index' mode is signaled, followed by the index value, it is necessary to determine whether the index value corresponds to an 'escape' sample. For example, assume the maximum number of bits to read the index value signaled using truncated binary coding is K bits. Then, to determine whether the signaled value corresponds to an 'escape' sample, it is necessary to parse (K−1) bits (e.g., using CABAC bypass mode). Depending on the value of the first (K−1) bits, another bit may need to be parsed (e.g., using CABAC bypass mode). These multiple stages of parsing may slow down the parsing process and reduce throughput.

Another design principle used throughout the HEVC design is grouping bypass bins. However, current proposals for escape sample signaling in palette coding mode prevents the grouping of bypass coded bins/syntax elements. For example, if there are two consecutive escape samples, the index values and component values (possibly quantized) are all coded in bypass mode. However, before the second escape sample, an 'index' mode flag needs is signaled, which is context-coded (i.e., not coded in bypass mode). Thus, even when there are two consecutive escape samples, the bypass bins coded for such consecutive samples cannot be grouped together. In case the escape samples are not consecutive, there may be other context-coded bins (e.g. for run-length coding) between the bypass bins corresponding to those escape samples.

In view of the aforementioned drawbacks, this disclosure proposes techniques for explicitly signaling the position of the escape samples within a block coded with palette-based coding mode. Certain aspects of the techniques of this disclosure will be described below with reference to video encoder 20. It should be understood that video decoder 30 may also perform the techniques of this disclosure, but in a reciprocal manner to the described video encoding techniques.

Consider an example where that the palette_esc_val_present_flag is 1, indicating that escape samples are present in the current block. In this example, video encoder may be configured to encode a binary vector b, where each value in the binary vector b indicates if a corresponding sample in the block is an escape sample (e.g., indicated by a 1 in the binary vector, or vice versa) or non-escape sample (e.g., indicated by a 0 in the binary vector, or vice versa). An example of such a vector may be as follows: b=0, 0, 0, 1, 1, 1, 0, 0, 0, 0, 0, 0, 1, 0, 0, 0 (binary vector indicating whether a sample is escape (1) or non-escape (0)). For simplicity, the example binary vector b is for a 4×4 block, although in some examples of palette coding, palette mode can only be used at the CU level (e.g., 8×8 or above).

This disclosure proposes that video encoder 20 be configured to explicitly signal information indicating a binary vector b (e.g., as shown above) to video decoder 30 to indicate at which positions in the block escape samples are used. Information indicating the binary vector b may be coded by coding runs of ones or runs of zeros. In one example of the disclosure, because a binary vector indicating the locations of escape samples is more likely to have more 0 values than 1 values (e.g., assuming that a 1 value indicates an escape sample), video encoder 20 may be configured to encode the binary vector b indicating the locations of sample pixels by coding runs of zero values.

In one example of the disclosure, video encoder 20 may be first configured to encode a syntax element indicating the total number of escape samples −1. Video encoder 20 need not encode the entire total number of escape samples because video decoder 30 may infer that there is at least one escape sample in a block given the value of the palette_esc_val_present_flag. That is, if video decoder 30 receives a palette_esc_val_present_flag with a value of 1, video decoder 30 may infer that there is at least one escape sample in the block. Therefore, video encoder 20 need only encode the total number of escape samples −1 to indicate the actual total number of escape samples to video decoder 30. In this way, fewer bits are needed to signal the total number of escape samples.

Figure 4:
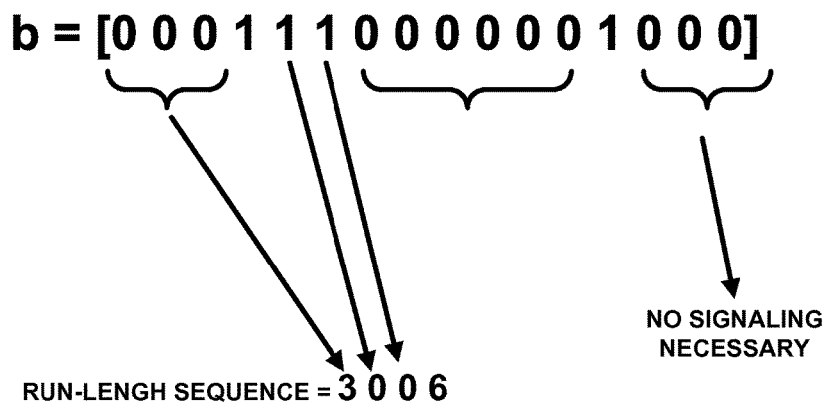
FIG. 4 is a conceptual diagram showing an example binary vector and run-length sequence coded according to the techniques of this disclosure.

In the above example binary vector b, the total number of escape samples is 4, thus the number of escape samples −1 is 3. After decoding the value of the syntax element indicate the total number of escape samples −1, video decoder 30 may determine that four runs of zeros are expected. In that case, video encoder 20 may be configured to convert the above binary vector b to run values as follows: 3, 0, 0, 6. FIG. 4 shows the binary vector b converted to the run-length sequence 3, 0, 0, 6. These run values indicate that there are 3 zeros, followed by a 1. Then, there are 0 zeroes followed by a 1. Next, there are again 0 zeroes followed by a 1. Next, there are 6 zeroes followed by a 1. Since video decoder 30 has already determined that there are only 4 total escape values, video decoder 30 may then determine that the last 3 entries in the binary vector b are 0 without any explicitly signaling from video encoder 20. Likewise, once video encoder 20 has indicated all of the possible escape samples given the signaled total number of escape samples −1, video encoder 20 need not signal any further runs of zeros in the binary vector b. In another example, instead of signaling the number of escape samples explicitly, the run length coding may be continued to the end of the block. In this case, the run values would be 3, 0, 0, 6, 3. Video encoder 20 would not signal a 1 following the last run of 3 zeros, since the block would end after the 3 zeros In accordance with one or more examples of this disclosure related to run-length based signaling, to code the run-length sequence, a Golomb-Rice code, Exponential-Golomb code of any order, concatenation of Golomb-Rice and exponential Golomb code, Truncated Exponential-Golomb code, Truncated-Rice code, concatenation of truncated Golomb-Rice and truncated exponential Golomb code or any other binarizations, including truncated binarizations, may be used. In one example, binary prediction vector compression unit 209 uses a 0-th order Exponential-Golomb code as the run-length coding technique.

For the truncated binarization, the maximum possible value of the run of zeros depends on the position of the previous '1' in the binary vector, the binary vector size, and the number of remaining escape sample. For the above example with the binary vector of a particular size, e.g., 16, with 4 escape symbols, the run-length sequence '3-0-0-6-' can be coded with the truncated binarization '3[12]-0[9]-0[9]-6[9]', where the maximum possible run value is provided in the brackets.

In one example of the disclosure, the run values are coded in bypass mode. In another example of the disclosure, part of a prefix in the binarization of run values may be context-coded and the remaining prefix bins and suffix bins may be bypass coded. Also, in some examples, binarization may be dependent on the position or index of the element (0 or 1) in the binary vector. As a particular example, if the position is smaller than a certain threshold, one type of binarization is used; otherwise, another type of binarization is applied. In some examples, the binarization type can be different binarization codes, or the same code family but with different order, such as Exponential-Golomb code.

In the above example, video encoder 20 may first signal the palette entries for one or more blocks of video data. Video encoder 20 may then determine if there are any escape samples in the one or more blocks of video data associated with the palette entries. If yes, video encoder 20 signals a syntax element indicating the number of escape samples in the block. In accordance with the techniques above, video encoder 20 may signal a flag indicating that there are escape samples for the one or more block of video data, and then signal a syntax element indicating the total number of escape samples −1. Video encoder 20 would then encode a binary vector indicating the positions of the escape samples in the one or more blocks of video data. In accordance with the techniques above, video encoder 20 may further encode the binary vector as a run of zeroes using the techniques described above. Video encoder 20 may also be configured to explicitly signal the values of the escape samples. In some examples, video encoder 20 may quantize the escape samples. In this way, all the escape samples are signaled together, and since the escape samples are signaled in bypass mode, more bypass coded bins are grouped together in relation to previously-proposed techniques discussed above. In one example of the disclosure, the run values (i.e., the run or zeros in the binary vector signifying the positions of the escape samples) are coded in bypass mode. In another example of the disclosure, part of a prefix in the binarization of run values may be context-coded and the remaining prefix bins and suffix bins may be bypass coded. It should be noted that video encoder 20 may signal the escape samples before or after the binary vector, but after the indication for the total number of escape samples in the block.

Vide decoder 30 may be configured to receive the palette entries for the one or more blocks of video data and receive a syntax element indicating if there are any escape samples in the one or more blocks associated with the received palette entries. If so, video decoder 30 may be further configured to receive a syntax element indicating the total number of escape samples −1 in the one or more blocks of video data. Video decoder 30 may determine the total number of escape samples by adding 1 to the value of the received syntax elements. Video decoder 30 may further receive syntax elements indicating the positions of the escape samples in the one or more blocks of video data. As discussed above, the syntax elements indicating the positions of the escape samples may be in the form of a run-length sequence that encodes runs of zero values (e.g., values in the binary vector indicating non-escape samples). Video decoder 30 may decoded the run-length sequence using the determined total number of escape samples to determine the positions of the escape samples in the one or more blocks. Video decoder 30 may also be configured to receive the quantized escape samples as well as syntax elements indicating the various palette modes used for each sample in the block. Video decoder 30 may then decode the one more blocks using the decoded information described above.

In another example of the disclosure, video encoder 20 may be configured to signal the palette modes (e.g., 'copy above' or 'index' modes) and run-length sequence values after signaling the quantized values for each component of escape samples for the entire block. However, it is possible to use different ordering. For example, video encoder 20 may first signal a run-length sequence value that specifies the position of the next escape sample. Video encoder 20 may then signal the palette modes and run-length sequence values until the next escape sample is reached. This may be followed by the quantized values of components for the next escape sample. In another example, the order of values signaled by video encoder 20 may be: a run value that specifies the position of the next escape sample, values or quantized values of color components for the next escape sample, and palette modes and run-lengths till the next escape sample.

In another example of the disclosure, video encoder 20 and/or video decoder 30 may use the knowledge of the position of the escape samples to code the index values in 'index' mode, as well as run-lengths in both 'copy above' and 'index' modes. This may be accomplished using one or both of the following techniques.

In one example, since the position of the escape samples is known, in 'index' mode, video encoder 20 does not need to increment the palette size by 1 to account for the index assigned to indicate escape sample. Thus, the maximum value for truncated binary coding is smaller by 1.

In another example, the run in 'index' or 'copy above' is bounded by the position of the next escape sample. This is useful when truncated binary coding, truncated exponential Golomb coding, truncated Golomb-Rice coding or a concatenation of truncated Golomb-Rice and truncated exponential Golomb coding is used to signal the run-lengths. Let the current position in the scan be i. Let the position of the next escape sample be at position j. Then the maximum possible run value in 'index' or 'copy above' mode is (j-1-i). The knowledge of escape symbols in previous row (or column for vertical scan) may be used to derive a tighter constraint on the maximum possible run value in 'copy above' mode if the escape symbols are not allowed to be copied in 'copy above' mode. This is because, the 'copy above' run has to break when it reaches the sample that is directly below an escape sample.

Some examples of this disclosure relate to end position coding of the run-length sequence indicating the binary vector b. In one or more examples of this disclosure, video encoder 20 may be configured to encode the binary vector b using a reserved run-length L to code the ending position of the binary vector. In one example, L=1 is used as the reserved run-length. At video encoder 20, if the run-length is equal to or greater than L, video encoder 20 is configured to add 1 to the run-length. If the actual run-length is less than L, video encoder 20 is configured to signal the run-length as is. Binary prediction vector compression unit 209 may signal the end position run-length with the reserved run-length L.

Likewise, at video decoder 30, if the decoded value of a run-length is larger than L, 1 is subtracted from the actual run-length. If the decoded value or a run-length is smaller than L, the decoded value is used as the actual run-length. If the decoded value is equal to L, the remaining positions in the binary prediction vector b are all 0. Hence, if the decoded value is equal to L, no more run signaling is necessary.

Using the same example as above (i.e., b=[0001110000001000]) and assuming that L=4, video encoder 20 is configured to signal the run-length sequence '3-0-0-6' of FIG. 4 as '3-0-0-7-4'. Then, applying the above rules, video decoder 30 may be configured to recover the run-length sequence as '3-0-0-6-end'. That is, the first run-length value of 3 is decoded as 3 and the next two run-length sequence values of 0 are decoded as 0, as both of the 0 run-length sequence values are less than the reserved run-length value of L=4. The next run-length sequence value is 7, and as such, video decoder 30 would be configured to subtract 1 from the value of 7 to obtain 6, because the received value of 7 is greater than the reserved run-length value of L=4. Finally, the last received run-length value 4 is equal to the reserved run-length value of L=4. Accordingly, video decoder 30 may determine that no further values of '1' are present in the binary vector b. When this method is used, it is not necessary to explicitly signal the indication regarding the number of escape samples in the block.

In another example of the disclosure, video encoder 20 may be configured to code run-length sequence values for both 0 and 1 elements in the binary vector b. In this example, the very first run-length value that is signaled can be associated with either a 0 or 1 value in the binary vector b. Whether the first run is associated with runs of zeros or runs of ones may be known a priori to both video encoder 20 and video decoder 30, or may be explicitly signaled. The reserved run value can also be applied to either 0 or 1 element to terminate the signaling of the binary vector. In this case, the run value is not needed to be adjusted (increased if greater than the reserved value) for the element with which the reserved value is not applied, meaning that reserved run value can be used only with one element (0 or 1), and not needed for the other element.

When using this technique of the disclosure, video encoder 20 signals that actual run value so that it is smaller by one than the actual run value except for the first run. This is because the run of zeros is always followed by a run of ones and vice versa. Thus, in the above example binary vector b, assuming run of zeros is signaled first, video encoder 20 may be configured to code the binary vector b to the following run-length sequence: 3, 2, 5, 0, 2.

For example, video encoder 20 may be configured to signal the run value of three ones as a 2 and the following run of 6 zeros as a 5, and so on. In this example, the number of ones (escape values) or number of zeros is not signaled explicitly. Also, a reserved value to indicate there are no more escape samples in the block is also not signaled. In another example of the disclosure, the run value can be signaled for 1 element (e.g., escape sample) of the binary vector, and all described methods above can be applied.

In some cases, the number of 0 elements at the end of the binary vector b may be smaller than the reserved run value L. In this case, it might be more efficient to signal the run value for the remaining 0 elements. In the example above, instead of signaling a 4 to indicate that there are no more escape samples, video encoder 20 may be configured to to signal a run of 3 zeros. In this case, the signaled run-length sequence values may be as follows: 3, 0, 0, 7, 3. Instead of remaining zeros (3 in this case), video encoder 20 may be configured to code a truncated run-length sequence value as described below.

Video encoder 20 may be configured to code the run-length sequences values using fixed-length coding, truncated binary coding, truncated exponential Golomb coding, truncated Golomb-Rice coding, concatenation of truncated Golomb-Rice and truncated exponential Golomb or a concatenation of unary or truncated unary and truncated exponential Golomb coding. In one example, a truncated exponential Golomb code of order 2 is used. For using truncated codes or fixed length codes, video encoder 20 knows the maximum value that needs to be coded. The maximum run value depends on the size of the binary vector b, the remaining number of escape pixels in the block, and the position of the previous escape sample in the binary vector, and the maximum value can be derived as follows.

Consider the first example where video encoder 20 signals the number of escape samples explicitly (e.g., number of escape samples −1). Consider that the total number samples in the block is B and the total number of escape samples is N. Suppose video encoder 20 has signaled M run values, S0, S1, . . . , S(M−1) have so far. Let $$S = \sum_{i=0}^{M-1} S_i.$$

Then, the maximum possible value for the next run is equal to (B−(S+M)−(N−M))=(B−(S+N)). Using this equation, video encoder 20 may determine the maximum possible run-length sequence value at each position of binary vector b. This can also be expressed in an equivalent manner as follows. Let the indices of the binary vector be from 0 to B−1. Let the starting position for the current run of zeros be i and the number of remaining ones (escape samples) be R. Then, the maximum possible run value may be specified as (B−i−R). Video encoder 20 and video decoder 30 may also use this technique for determining a maximum run value for a run of indices indicating a particular mode of palette-coding (e.g., copy above mode).

In another example of the disclosure, where video encoder 20 does not signal the number of samples explicitly, the maximum run-length sequence value for the next run-length sequence value may be determined as min(A, (B−(S+M)−1)), where A is the run value assigned to indicate that there are no more non-zero entries from that position onwards and 'min' selects the minimum value from the list. This assumes that either reserved run value or the actual runs of zeros is signaled to indicate that there are no more escape samples.

In some examples, the run-length sequence value may not be signaled if the maximum possible run value is 0. For example, consider the following binary vector and consider that runs of both ones and zeros are being signaled: . . . , 1, 0. Then, the maximum possible run value for the last 0 element is 0 (after decrementing by 1 as described above). So, video encoder 20 may not signal the run-length sequence value for the last 0 element and video decoder 30 may infer the run-length sequence value to be equal to 0.

For truncated exponential Golomb coding, truncated Golomb-Rice coding or a concatenation of unary and truncated exponential Golomb coding, the prefix and/or suffix may use truncation. In this example, a variant of an exponential Golomb (Exp-Golomb code), named as truncated Exp-Golomb code, may be used. This code is suitable to code run-length values when the maxim possible run-length is known.

Similar to a kth order Exp-Golomb (EGk) code, the $k^{th}$ order truncated Exp-Golomb (TEGk) code word is also composed of two parts, a prefix and a suffix. For a given unsigned integer x and its largest possible value X, the prefix part of the EGk code word consists of a truncated unary code corresponding to the value of l(x)=

$$\left\lfloor \log_2\left(\frac{x}{2^k} + 1\right) \right\rfloor.$$

Specifically, the 'trailing one' of the unary code can be avoided if $$\left\lfloor \log_2\left(\frac{x}{2^k} + 1\right) \right\rfloor == l(x).$$

If the prefix is truncated, i.e., $$\left\lfloor \log_2\left(\frac{x}{2^k} + 1\right) \right\rfloor == l(x),$$

the suffix part of TEGk is computed as the truncated binary representation [1] of $x-2^k(2^{l(x)}-1)$ using k+l(x) or k+l(x)−1 bits. The maximum symbol value for the input of truncated binary code is $X-2^k(2^{l(x)}-1)$.

If the prefix is not truncated, the suffix part of TEGk is the same as EGk, i.e. binary representation of $x-2^k(2^{l(x)}-1)$ using k+l(x) bits. Table I is an example of TEG0.

TABLE I

Example of TEG0 (X = 5)

| Value x | Code word (prefix-suffix) | Code word length |
|---|---|---|
| 0 | 1 | 1 |
| 1 | 01-0 | 3 |
| 2 | 01-1 | 3 |
| 3 | 00-0 | 3 |
| 4 | 00-01 | 4 |
| 5 | 00-10 | 4 |

It is proposed to use TEGk to the code the run-length sequence for binary vector b.

In another example, a hierarchical structure may be used to code the escape sample positions, such as a group-based signaling technique. For this example, assume that the binary vector indicating the positions of the escape samples is denoted by:

$b=[b_0, b_1, \ldots, b_{N-1}], N \geq 0, b_i \in \{0,1\}, 0 \leq i < N$ and $b_i \in \{0,1\}$, $0 \leq i < N$ is referred to as an escape sample. If N=0, b=ϕ is empty vector, which does not need to be signaled. Therefore, in the following description, it is assumed that N>0.

A technique for group-based signaling is now described. It is proposed that the binary vector b is divided into K non-overlapping groups (K>0) and that the union of the groups covers the entire binary vector b. Each group is denoted as $G_k=[b_{k,0}, b_{k,1}, \ldots, b_{k,C_k-1}]$, $0 \leq k < K$. Each group contains one or more prediction flags, i.e. $C_k>0$. In an example, the groups are contiguous. For example, $G_0=[b_0, b_1, b_2, b_3]$, $G_1=[b_4, b_5, b_6]$, $G_2=[b_7, b_8]$ and so on. Other methods of partitioning such as interleaved partitioning are possible as well. As one example, for interleaved partitioning, groups may be formed by interleaved prediction flags (e.g., $G_0=b_0, b_4, b_8, b_{12}, G_1=b_1, b_5, b_9, b_{13}, G_2=b_2, b_6, b_{10}, b_{14}$). The order of the flags in the groups can be according to a scan of entries in a predictor palette or other predictor list, e.g., such that $b_0$ is the first flag in the list or palette, $b_1$ is the second flag in the list or palette, and so forth.

The technique of group partitioning, the order of the groups and the ordering of the prediction flags within each group can be predefined (meaning both video encoder 20 and video decoder 30 are assumed to know this partitioning) or adaptively signaled by video encoder 20 in the coded bitstream. Video encoder 20 may be configured to signal the indications of escape samples in the groups in the bitstream group by group according to the defined order.

Before or after signaling binary flags in each group, video encoder 20 may signal a 'stopping' flag in the bitstream, indicating whether the remaining indications of escape samples in the binary vector are 0. If the 'stopping' flag indicates that the there are no more non-zero indications, video encoder 20 may skip signaling of the remaining flags. For example, coding of the remaining flags, e.g., by encoding at video encoder 20 or parsing and decoding at video decoder 30, can be skipped. In one example, the 'stopping' flag is signaled (e.g., signaled by video encoder 20 and received by video decoder 30) after signaling each group. There is no need to signal the 'stopping' flag after the last possible group since if the last possible group is reached, it shall at least contain one non-zero indication. In this case, the 'stopping' flag can be inferred equal to 1.

If the 'stopping' flag signaled after group $G_{k-1}$ is zero (meaning that some of the remaining indications are non-zero) and all the prediction flags in group $G_k$ are 0, the 'stopping' flag is not signalled after group $G_k$ as it can be inferred that some of the remaining indications are non-zero.

In another example of the disclosure, the binary vector b may be coded using binary tree based signaling. In this example, video encoder 20 may be configured to partition binary vector b into several contiguous regions, with each region containing one or more of the indications of escape sample positions. Video encoder 20 may be configured to signal one bit to indicate whether all of the elements within that region are 0 or not. If the region is not all zero, video encoder 20 may further split that region into sub regions in same manner discussed above.

The partitioning of regions can be stopped according to given rules. For example, the rule can be "if the region size is smaller than a threshold, the partition process stops". When the partitioning stops, if the region size is greater than one, and it contains non-zero elements, video encoder 20 may signal each element in the region in the bitstream. In this case, assuming that the region size is X, if the first X−1 elements are all zero, the last element must be 1, so video encoder 20 need not include that element in the bitstream.

It should be understood that the aforementioned techniques described in this disclosure may be used together in any combination.

Figure 7:
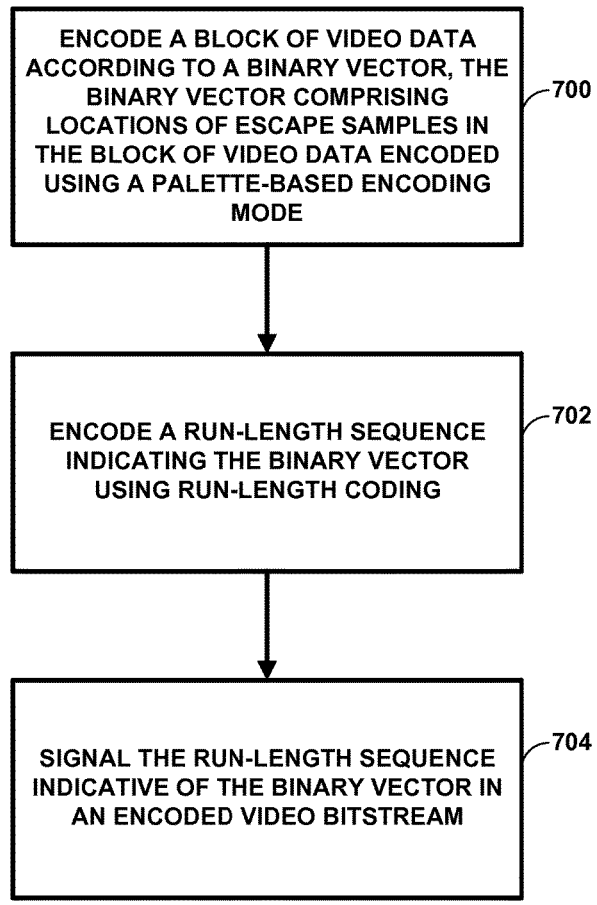
FIG. 7 is a flowchart showing an example encoding method according to the techniques of this disclosure.

FIG. 7 is a flowchart showing an example encoding method according to the techniques of this disclosure. The techniques of FIG. 7 may be implemented by one or more structures of video encoder 20 including palette-based encoding unit 122.

In one example of the disclosure, video encoder 20 may be configured to encode a block of video data according to a binary vector, the binary vector comprising indications of locations of escape samples in the block of video data encoded using a palette-based coding mode (700). Video encoder 20 may be further configured to encode a run-length sequence indicating binary vector using run-length coding (702), and signal the run-length sequence indicative of the binary vector in an encoded video bitstream (704).

In other examples, the techniques of the disclosure do not require specifically a binary vector or a run-length sequence of to indicate the escape samples positions. In one example of the disclosure, video encoder 20 may be configured to signal information indicating the positions of escape samples in a block of video data encoded using a palette-based coding mode, wherein the information indicating the positions of escape samples in the block is signaled before signaling syntax elements indicating one or more palette-based coding modes and run values associated with the one or more palette-based coding modes. In this way, all of the information indicating the positions of the escape samples is grouped together. This may be beneficial in circumstances where the escape samples are encoded using bypass mode of CABAC, as the syntax elements coded using bypass mode may be grouped together and encoded at the same time. This may be more efficient than interleaving information indicating escape samples with syntax elements indicating one or more palette-based coding modes and run values associated with the one or more palette-based coding modes, which may be coded using the regular mode of CABAC (i.e., with contexts). Switching between regular mode and bypass mode of a CABAC coder (e.g., entropy encoding unit 118) may be inefficient.

Figure 8:
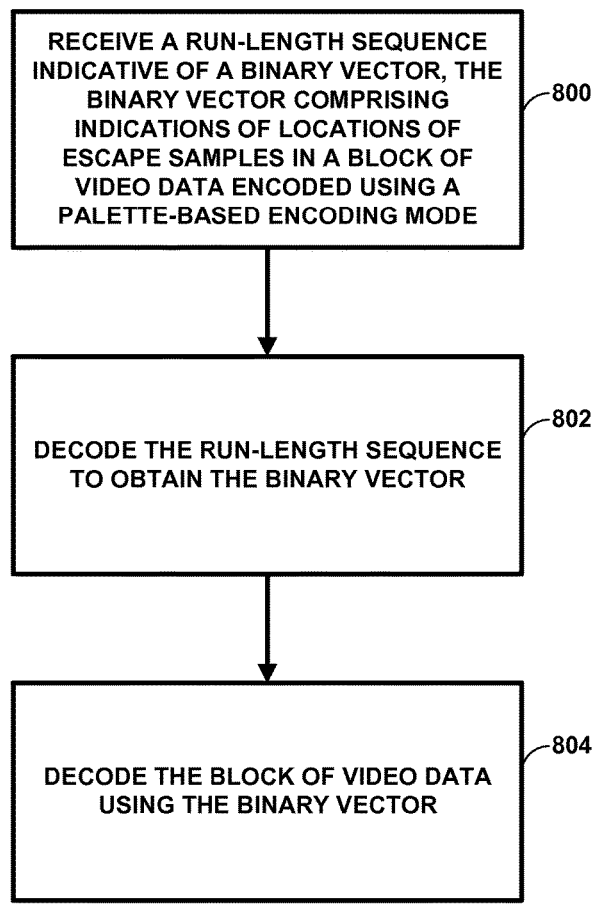
FIG. 8 is a flowchart showing an example decoding method according to the techniques of this disclosure.

FIG. 8 is a flowchart showing an example decoding method according to the techniques of this disclosure. The techniques of FIG. 8 may be implemented by one or more structures of video decoder 30 including palette-based decoding unit 165.

In one example of the disclosure, video decoder 30 may be configured to receive a run-length sequence indicative of a binary vector, the binary vector comprising indications of locations of escape samples in a block of video data encoded using a palette-based coding mode (800). Video decoder 30 may be further configured to decode the run-length sequence to obtain the binary vector (802), and decode the block of video data using the binary vector (804). Additional example methods that may be used in conjunction with the method of FIG. 8 are described below.

In other examples, the techniques of the disclosure do not require specifically a binary vector or a run-length sequence of to indicate the escape samples positions. In one example of the disclosure, video decoder 30 may be configured to receive information indicating the positions of escape samples in a block of video data encoded using a palette-based coding mode, wherein the information indicating the positions of escape samples in the block is received before receiving syntax elements indicating one or more palette-based coding modes and run values associated with the one or more palette-based coding modes, and decode the block of video data using the received information. In this way, all of the information indicating the positions of the escape samples is grouped together. This may be beneficial in circumstances where the escape samples are decoded using bypass mode of CABAC, as the syntax elements decoded using bypass mode may be grouped together and encoded at the same time. This may be more efficient than interleaving information indicating escape samples with syntax elements indicating one or more palette-based coding modes and run values associated with the one or more palette-based coding modes, which may be decoded using the regular mode of CABAC (i.e., with contexts). Switching between regular mode and bypass mode of a CABAC coder (e.g., entropy decoding unit 150) may be inefficient.

In another example of the disclosure, video decoder 30 may be configured to receive palette entries for the block of video data, receive one or more escape samples, and receive a plurality of flags indicating the palette mode for each respective pixel in the block of video data. Video decoder 30 may be configured to decode block of video data using the palette entries, the one or more escape samples, the binary vector, and the plurality of flags indicating the palette mode for each respective pixel in the block of video data.

In another example of the disclosure, video decoder 30 may be configured to receive the one or more escape samples after receiving the run-length sequence but before receiving mode flags and run values corresponding to the mode flags, wherein the one or more escape samples are grouped together, and decode the binary vector and the one or more escape samples in a bypass mode of CABAC.

In another example of the disclosure, video decoder 30 may be configured to receive a syntax element indicative of the total number of escape samples used when encoding the block of video data, receive the one or more escape samples before receiving the run-length sequence and before receiving mode flags and run values corresponding to the mode flags, wherein the one or more escape samples are grouped together, and decode the binary vector, the syntax element indicative of the total number of escape samples, and the one or more escape samples in a bypass mode of CABAC.

In another example of the disclosure, video decoder 30 may be configured to receive a syntax element indicative of the total number of escape samples used when encoding the block of video data. Video decoder may be configured to decode the run-length sequence to obtain the binary vector using the total number of escape samples.

In one example of the disclosure, the syntax element indicating the total number of escape samples is represented as the total number of escape values −1. In another example of the disclosure, the run-length sequence includes one or more values indicating the run-length of 0 values between each 1 value in the binary vector. In another example of the disclosure, the run-length sequence includes one or more values indicating the run-length of 0 values between each 1 value in the binary vector and a special value indicating the last 1 value in the binary vector. In another example of the disclosure, video decoder 30 may be configured to decode the run-length sequence by incrementing a particular value in the run-length sequence by one in the case that the particular value of is greater than the special value.

In another example of the disclosure, video decoder 30 is configured to decode the run-length sequence using a truncated code, and determine a maximum value of the run-length sequence for each value in the run-length sequence. In another example of the disclosure, the truncated code is a truncated exponential Golomb code, and wherein determining the maximum value comprises determining the maximum value of the run-length sequence for each value in the run-length sequence according to the following equation: (B-i-R), wherein B is the total number of samples in the block of video data, i is a starting position of a current run of zeros, and R is the number of remaining escape samples.

In another example of the disclosure, video decoder 30 is configured to receive a first run of indices for a copy above mode, receive a second run of indices for an index mode, and decode the first run of indices and the second run of indices with a truncated code. In another example of the disclosure, video decoder 30 is further configured to determine a maximum value of the first run of indices and the second run of indices each value in the first run of indices and the second run of indices according to the following equation: (j-1-i), wherein j is a next escape symbol at position j in the block, and i is a current position in the block.

In another example of the disclosure, video decoder 30 may be configured to first receive a syntax element indicative of the total number of escape samples used when encoding the block of video data, next receive the run-length sequence indicative of the binary vector, the binary vector comprising indications of locations of escape samples in a block of video data encoded using the palette-based coding mode, next receive the one or more escape samples, next receive one or more mode flags for at least one of a copy above mode or an index mode, and next receive associated run values for each of the one or more mode flags.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a run-length sequence indicative of a binary vector, the binary vector indicating the positions of escape samples in a block of video data encoded using a palette-based coding mode, wherein the run-length sequence is received before receiving syntax elements indicating one or more palette-based coding modes and run values associated with the one or more palette-based coding modes;
   decoding the run-length sequence to obtain the binary vector before decoding syntax elements indicating one or more palette-based coding modes and run values associated with the one or more palette-based coding modes; and
   decoding the block of video data using the binary vector.

2. The method of claim 1, further comprising:
   receiving palette entries for the block of video data;
   receiving one or more escape samples; and
   receiving a plurality of flags indicating the palette mode for each respective pixel in the block of video data, wherein decoding the block of video data comprises:
   decoding the block of video data using the palette entries, the one or more escape samples, the binary vector, and the plurality of flags indicating the palette mode for each respective pixel in the block of video data.

3. The method of claim 1, further comprising:
   receiving the one or more escape samples after receiving the run-length sequence but before receiving mode flags and run values corresponding to the mode flags, wherein the one or more escape samples are grouped together; and
   decoding the binary vector and the one or more escape samples in a bypass mode of context adaptive binary arithmetic coding (CABAC).

4. The method of claim 1, further comprising:
   receiving a syntax element indicative of the total number of escape samples used when encoding the block of video data;
   receiving the one or more escape samples before receiving the run-length sequence and before receiving mode flags and run values corresponding to the mode flags, wherein the one or more escape samples are grouped together; and
   decoding the binary vector, the syntax element indicative of the total number of escape samples, and the one or more escape samples in a bypass mode of context adaptive binary arithmetic coding (CABAC).

5. The method of claim 1, further comprising:
   receiving a syntax element indicative of the total number of escape samples used when encoding the block of video data, wherein decoding the run-length sequence comprises decoding the run-length sequence to obtain the binary vector using the total number of escape samples.

6. The method of claim 1, wherein the run-length sequence includes one or more values indicating the run-length of 0 values between each 1 value in the binary vector.

7. The method of claim 1, wherein the run-length sequence includes one or more values indicating the run-length of 0 values between each 1 value in the binary vector and a special value indicating the last 1 value in the binary vector.

8. The method of claim 7, wherein decoding the run-length sequence comprises incrementing a particular value in the run-length sequence by one in the case that the particular value of is greater than the special value.

9. The method of claim 1, wherein decoding the run-length sequence comprises:
   decoding the run-length sequence using a truncated code; and
   determining a maximum value of the run-length sequence for each value in the run-length sequence.

10. The method of claim 9, wherein the truncated code is a truncated exponential Golomb code, and wherein determining the maximum value comprises determining the maximum value of the run-length sequence for each value in the run-length sequence according to the following equation: (B-i-R), wherein B is the total number of samples in the block of video data, i is a starting position of a current run of zeros, and R is the number of remaining escape samples.

11. The method of claim 1, further comprising:
    receiving a first run of indices for a copy above mode;
    receiving a second run of indices for an index mode; and
    decoding the first run of indices and the second run of indices with a truncated code.

12. The method of claim 11, further comprising:
    determining a maximum value of the first run of indices and the second run of indices each value in the first run of indices and the second run of indices according to the following equation: (j-1-i), wherein j is a next escape symbol at position j in the block, and i is a current position in the block.

13. The method of claim 1, further comprising:
    first receiving a syntax element indicative of the total number of escape samples used when encoding the block of video data;
    next receiving the run-length sequence indicative of the binary vector, the binary vector comprising indications of locations of escape samples in a block of video data encoded using the palette-based coding mode;
    next receiving the one or more escape samples;
    next receiving one or more mode flags for at least one of a copy above mode or an index mode; and
    next receiving associated run values for each of the one or more mode flags.

14. The method of claim 1, the method being executable on a wireless communication device, wherein the device comprises:
    a memory configured to store the video data;
    a processor configured to execute instructions to process the video data stored in the memory; and
    a receiver to receive the video data and the run-length sequence.

15. The method of claim 14, wherein the wireless communication device is a cellular telephone and the video data and the run-length sequence are received by the receiver and modulated according to a communication standard.

16. An apparatus configured to decode video data, the apparatus comprising:
    a memory configured to store the video data; and
    a video decoder comprising processing circuitry configured to:
    receive a run-length sequence indicative of a binary vector, the binary vector indicating the positions of escape samples in a block of the video data encoded using a palette-based coding mode, wherein the run-length sequence is received before receiving syntax elements indicating one or more palette-based coding modes and run values associated with the one or more palette-based coding modes;

decode the run-length sequence to obtain the binary vector before decoding syntax elements indicating one or more palette-based coding modes and run values associated with the one or more palette-based coding modes; and decode the block of the video data using the binary vector.

17. The apparatus of claim 16, wherein the processing circuitry is further configured to:

receive the one or more escape samples after receiving the run-length sequence but before receiving mode flags and run values corresponding to the mode flags, wherein the one or more escape samples are grouped together; and decode the binary vector and the one or more escape samples in a bypass mode of context adaptive binary arithmetic coding (CABAC).

18. The apparatus of claim 16, wherein the processing circuitry is further configured to:

receive a syntax element indicative of the total number of escape samples used when encoding the block of video data;

receive the one or more escape samples before receiving the run-length sequence and before receiving mode flags and run values corresponding to the mode flags, wherein the one or more escape samples are grouped together; and decode the binary vector, the syntax element indicative of the total number of escape samples, and the one or more escape samples in a bypass mode of context adaptive binary arithmetic coding (CABAC).

19. The apparatus of claim 16, wherein the run-length sequence includes one or more values indicating the run-length of 0 values between each 1 value in the binary vector.

20. The apparatus of claim 16, wherein the run-length sequence includes one or more values indicating the run-length of 0 values between each 1 value in the binary vector and a special value indicating the last 1 value in the binary vector.

21. The apparatus of claim 20, wherein to decode the run-length sequence the processing circuitry is further configured to increment a particular value in the run-length sequence by one in the case that the particular value of is greater than the special value.

22. The apparatus of claim 16, wherein to decode the run-length sequence the processing circuitry is further configured to:

decode the run-length sequence using a truncated code; and determine a maximum value of the run-length sequence for each value in the run-length sequence.

23. The apparatus of claim 22, wherein the truncated code is a truncated exponential Golomb code, and wherein the processing circuitry is further configured to determine the maximum value of the run-length sequence for each value in the run-length sequence according to the following equation: (B-i-R), wherein B is the total number of samples in the block of video data, i is a starting position of a current run of zeros, and R is the number of remaining escape samples.

24. The apparatus of claim 16, wherein the processing circuitry is further configured to:

receive a first run of indices for a copy above mode;
receive a second run of indices for an index mode; and
decode the first run of indices and the second run of indices with a truncated code.

25. The apparatus of claim 24, wherein the processing circuitry is further configured to:

determine a maximum value of the first run of indices and the second run of indices each value in the first run of indices and the second run of indices according to the following equation: (j-1-i), wherein j is a next escape symbol at position j in the block, and i is a current position in the block.

26. The apparatus of claim 16, wherein the processing circuitry is further configured to:

first receive a syntax element indicative of the total number of escape samples used when encoding the block of video data;

next receive the run-length sequence indicative of the binary vector, the binary vector comprising indications of locations of escape samples in a block of video data encoded using the palette-based coding mode;

next receive the one or more escape samples;

next receive one or more mode flags for at least one of a copy above mode or an index mode; and next receive associated run values for each of the one or more mode flags.

27. An apparatus configured to decode video data, the apparatus comprising:

means for receiving a run-length sequence indicative of a binary vector, the binary vector indicating the positions of escape samples in a block of video data encoded using a palette-based coding mode, wherein the run-length sequence is received before receiving syntax elements indicating one or more palette-based coding modes and run values associated with the one or more palette-based coding modes;

means for decoding the run-length sequence to obtain the binary vector before decoding syntax elements indicating one or more palette-based coding modes and run values associated with the one or more palette-based coding modes; and means for decoding the block of video data using the binary vector.

28. A non-transitory computer-readable storage medium storing instructions that, when executed, causes one or more processors configured to decode video data to:

receive a run-length sequence indicative of a binary vector, the binary vector indicating the positions of escape samples in a block of the video data encoded using a palette-based coding mode, wherein the run-length sequence is received before receiving syntax elements indicating one or more palette-based coding modes and run values associated with the one or more palette-based coding modes;

decode the run-length sequence to obtain the binary vector before decoding syntax elements indicating one or more palette-based coding modes and run values associated with the one or more palette-based coding modes; and decode the block of the video data using the binary vector.

* * * * *